(12) United States Patent
Holby

(10) Patent No.: US 7,677,017 B2
(45) Date of Patent: Mar. 16, 2010

(54) MODULAR POWER SOURCE FOR WALK-BEHIND MOWER

(75) Inventor: Bryan Holby, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 11/169,167

(22) Filed: Jun. 28, 2005

(65) Prior Publication Data

US 2006/0288680 A1    Dec. 28, 2006

(51) Int. Cl.
*A01D 34/00*    (2006.01)
(52) U.S. Cl. .......................................... 56/10.6; 56/249
(58) Field of Classification Search ................. 56/10.6, 56/11.9, 249, 249.5; 248/317, 220.22, 221.11, 248/222.12, 309.1, 311.2
See application file for complete search history.

(56) References Cited

U.S. PATENT DOCUMENTS

| | | | |
|---|---|---|---|
| 1,924,462 A | 8/1933 | Scofield | |
| 2,177,687 A | 10/1939 | Bracken et al. | |
| 2,733,661 A | 2/1956 | Surgi | |
| 2,891,677 A | 6/1959 | Ritchie | |
| 2,898,542 A | 8/1959 | Wasko et al. | |
| 3,581,480 A | 6/1971 | O'Connor | |
| 3,708,028 A | 1/1973 | Hafer | |
| 3,732,671 A | 5/1973 | Allen et al. | |
| 3,812,379 A * | 5/1974 | Kaufman et al. | 290/50 |
| 3,841,069 A | 10/1974 | Weck | |
| 3,860,081 A | 1/1975 | Moll et al. | |
| 3,946,543 A | 3/1976 | Templeton | |
| 3,983,952 A | 10/1976 | McKee | |
| 3,989,118 A | 11/1976 | Hansen | |
| 4,042,054 A | 8/1977 | Ward | |
| 4,117,651 A | 10/1978 | Martin, Jr. | |
| 4,199,037 A | 4/1980 | White | |
| 4,277,737 A | 7/1981 | Mueller-Werth | |
| 4,306,402 A | 12/1981 | Whimp | |
| 4,322,934 A | 4/1982 | Doi | |
| 4,348,628 A | 9/1982 | Loucks | |
| 4,354,149 A | 10/1982 | Armond et al. | |
| 4,413,698 A | 11/1983 | Conrad et al. | |
| D277,285 S | 1/1985 | Lopez | |
| 4,584,821 A | 4/1986 | Booth | |
| 4,835,409 A | 5/1989 | Bhagwat et al. | |
| 4,854,540 A | 8/1989 | Balek | |
| 4,870,811 A | 10/1989 | Steele | |
| 4,995,227 A | 2/1991 | Foster | |

(Continued)

FOREIGN PATENT DOCUMENTS

EP    1508266 A2    2/2005

(Continued)

*Primary Examiner*—Thomas B Will
*Assistant Examiner*—Jamie L McGowan
(74) *Attorney, Agent, or Firm*—Harness, Dickey & Pierce, P.L.C.

(57) ABSTRACT

A walk-behind mower includes a frame, and a cutting unit connected to the frame and at least one cutting element. Interchangeable power unit support assemblies are each adapted to support either a reciprocating engine or a battery unit. One of the power unit support assemblies is releasably connected to the frame. An electric motor is provided to displace the cutting element. An output voltage generated by either the reciprocating engine or the battery unit mounted on the power unit support assembly energizes the electric motor.

10 Claims, 5 Drawing Sheets

U.S. PATENT DOCUMENTS

| | | | |
|---|---|---|---|
| 5,098,146 A | 3/1992 | Albrecht et al. | |
| 5,156,226 A | 10/1992 | Boyet et al. | |
| 5,248,566 A | 9/1993 | Kumar et al. | |
| 5,360,307 A | 11/1994 | Schemm et al. | |
| 5,373,910 A | 12/1994 | Nixon | |
| 5,394,678 A | 3/1995 | Lonn | |
| 5,402,626 A | 4/1995 | Zinck | |
| 5,406,778 A | 4/1995 | Lamb et al. | |
| 5,442,901 A | 8/1995 | Niemela et al. | |
| 5,490,370 A | 2/1996 | McNair | |
| 5,542,488 A | 8/1996 | Nixon | |
| 5,606,851 A | 3/1997 | Bruener | |
| 5,629,102 A | 5/1997 | Werth | |
| 5,713,189 A | 2/1998 | Toman | |
| 5,727,372 A | 3/1998 | Kanitz et al. | |
| 5,794,422 A | 8/1998 | Reimers et al. | |
| 5,809,758 A | 9/1998 | Flanigan et al. | |
| 5,823,495 A * | 10/1998 | Joss et al. | 248/309.1 |
| 5,839,529 A | 11/1998 | DePaoli | |
| 5,909,064 A | 6/1999 | Feil et al. | |
| 5,934,051 A | 8/1999 | Hahn | |
| 5,934,053 A | 8/1999 | Fillman et al. | |
| 5,937,622 A | 8/1999 | Carrier et al. | |
| D416,858 S | 11/1999 | Domanski | |
| 6,047,786 A | 4/2000 | Stevenson et al. | |
| 6,082,084 A | 7/2000 | Reimers et al. | |
| 6,125,621 A | 10/2000 | Burch | |
| 6,269,617 B1 | 8/2001 | Blanchard | |
| 6,487,837 B1 * | 12/2002 | Fillman et al. | 56/11.9 |
| 6,523,334 B1 * | 2/2003 | Dettmann | 56/11.9 |
| 6,571,542 B1 * | 6/2003 | Fillman et al. | 56/10.6 |
| 6,622,464 B2 * | 9/2003 | Goman et al. | 56/16.9 |
| 6,729,114 B2 * | 5/2004 | Fillman et al. | 56/10.6 |
| 6,802,175 B2 * | 10/2004 | Fillman et al. | 56/11.9 |
| 2004/0168420 A1 | 9/2004 | Fillman et al. | |

FOREIGN PATENT DOCUMENTS

| | | |
|---|---|---|
| WO | WO 97/28681 | 8/1997 |
| WO | 2004/057166 | 7/2004 |

* cited by examiner

MODULAR POWER SOURCE FOR WALK-BEHIND MOWER

TECHNICAL FIELD

The present invention relates in general to lawn mowing machines and more specifically to a device and method for powering walk-behind mowers.

BACKGROUND

Lawn mowing machines adapted for cutting greens or other areas of golf courses generally have power units which include either a gasoline reciprocating engine or one or more electric motors powered by a plurality of batteries stored on the mower unit. Each mower design or configuration has its own power unit with unique configuration of components. Gasoline powered engine walk-behind mowers have generally long operating periods on a tank of fuel. Electric powered walk-behind mowers are generally quieter during operation than gasoline powered mowers. The power units of known gasoline powered mowers are not directly interchangeable with the power units of the electric powered mowers.

Golf courses have several conditions to meet which often do not allow the use of one of the above types of walk-behind mowers. During particular times of the day, for example, during early morning hours, noise ordinances can preclude the operation of gasoline powered engines and therefore require that the quieter operating electric powered mowers be used. Electric powered mowers have a drawback that their operating duration is limited due to the length of time their batteries hold a charge.

Golf courses therefore are often required to purchase several units of each type of walk-behind mowers, both gasoline and electric powered. This requirement results in additional costs for purchase, as well as increased costs of maintenance to maintain significantly different mower units. Because of differences in configuration, parts for one type of walk-behind mower generally are not interchangeable with the other type, therefore increased quantities of different parts are also required to be maintained.

SUMMARY

According to some embodiments of the modular power source for a walk-behind mower of the present invention, a power unit support assembly for a walk-behind mower includes a mower frame. A plurality of power unit support members are each adapted for interchangeably supporting a power unit and each releasably connectable to the mower frame. The power unit includes one of a reciprocating engine and a battery unit.

According to other embodiments, a walk-behind mower includes at least one cutting unit connected to the frame, each cutting unit having cutting elements. A power unit support member is adapted to interchangeably support one of a reciprocating engine and a battery unit. An electric motor is provided to rotate the reel blades. An output voltage generated by either the reciprocating engine or the battery unit mounted on the power unit support assembly energizes the electric motors.

According to still other embodiments, a method for interchangeably mounting one of a reciprocating engine and a battery unit to a walk-behind mower includes mounting the power unit to a selected one of the power unit support assemblies. The method further includes releasably connecting the selected one of the power unit support assemblies to the support device.

A modular power source for a walk-behind mower of the present invention offers several advantages. By interchangeably mounting each of a plurality of power unit types using similarly mounted support members, a walk-behind mower of the present invention can be adapted in the field to support either a reciprocating engine or a battery unit. Either a reciprocating engine having a generator, or a battery unit can be used to provide electrical power to energize multiple electric motors. The electric motors are separately energized to rotate a cutting blade assembly or to propel the greens mower. The interchangeable mount connections permit the power unit to be changed to accommodate different greens cutting conditions, such as noise restricted time periods or extended length cutting periods. A cord for each motor or a ganged electrical connection for multiple electric motors provides a releasable connection during change of the power unit. Quick mount fasteners and/or a sliding male/female joint provide for rapid interchangeability of the power units.

Further areas of applicability of the present invention will become apparent from the detailed description provided hereinafter. It should be understood that the detailed description and specific examples, while indicating some embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of several embodiments of the present invention is merely exemplary in nature and is in no way intended to limit the invention, its application, or uses. While the mower described herein will be described generally as a walk-behind mower, the teachings herein are equally applicable to all walk-behind mowers, including but not limited to, fairway, commercial landscape, reel, rotary, walk-behind, and rotary mowers.

Figure 1:
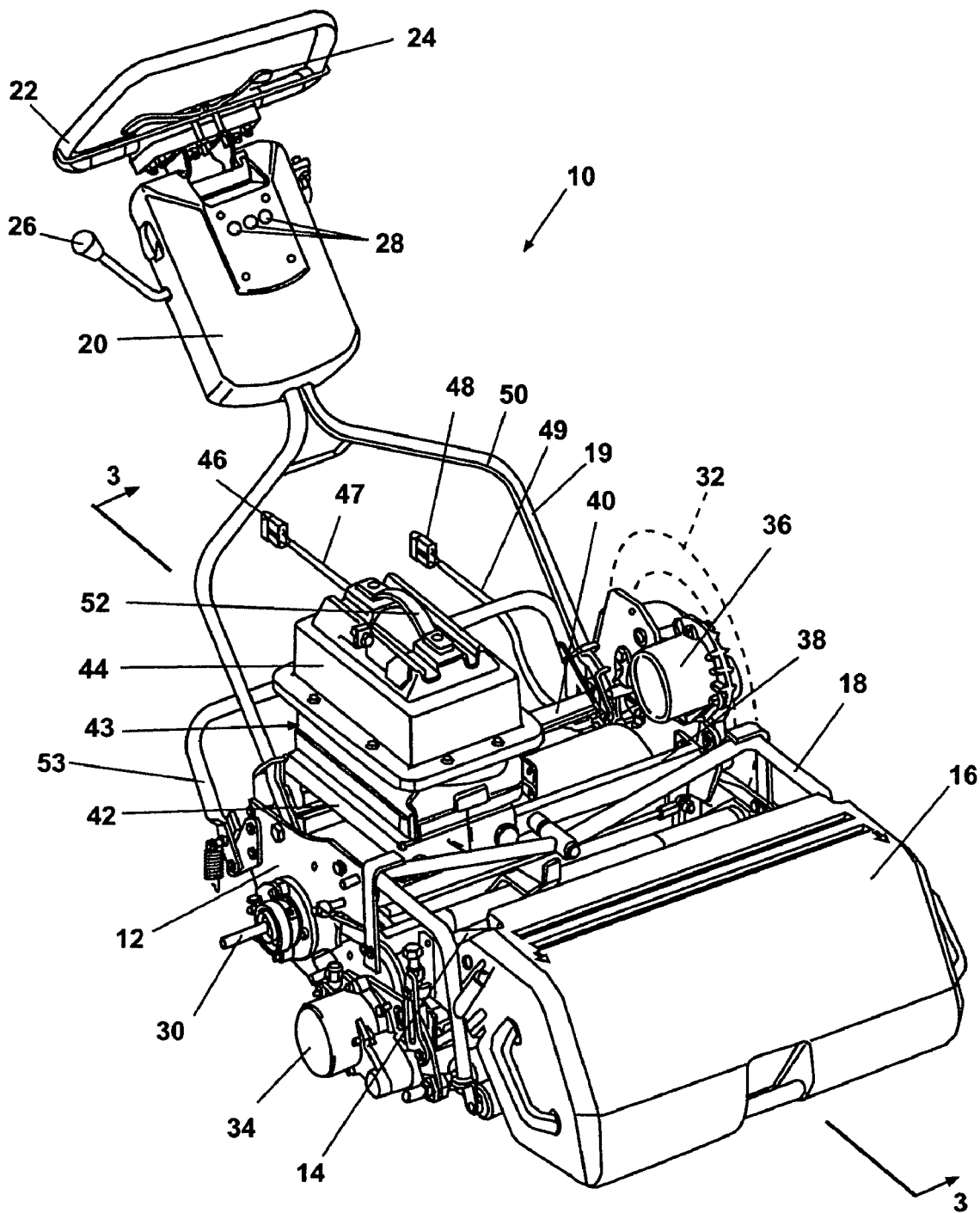
FIG. 1 is a perspective view of one embodiment of a walk-behind mower having a battery unit modular power source of the present invention.

Referring generally to FIG. 1 and according to various embodiments of the present invention, a walk-behind mower assembly 10 includes a frame 12, a mowing deck 14 connected to frame 12, and a deflection or collection housing 16 which is operable to receive or deflect the grass clippings from mowing deck 14. Housing 16 is supported by a housing support frame 18 to frame 12. A handle assembly 19 is also supported from frame 12 which is used by an operator to manually control walk-behind mower assembly 10.

Handle assembly 19 includes a control unit 20 and a tubular handle 22. A throttle 24 is disposed on handle 22 and is operable to control a direction and speed for walk-behind mower assembly 10. A break lever 26 is also provided on control unit 20 to manually position or release walk-behind mower assembly 10 in/from a parked position. A plurality of input switches 28 are positioned on control unit 20. Input switches 28 are used to manually predetermine items such as a rotational speed of a cutting head, a rotational speed of traction drum, etc.

Extending outward from frame 12 is a transport wheel shaft 30. Transport wheel shaft 30 provides for installation of wheels 32 (shown in phantom for information only) which are used for rapid transportation of walk-behind mower assembly 10 when it is not used for cutting purposes. Also connected to frame 12 is a first electric motor 34 which is used to rotate a cutting head assembly and a second electric motor 36 connected via a transmission such as a gear, pulley and/or belt system to propel walk-behind mower assembly 10 in either a forward or reverse direction. A frame first cross member 38 and a frame second cross member 40 provide support points for items such as housing support frame 18 and also stiffen frame 12. First and second cross members 38, 40, as well as frame 12 in general are provided of a metal material such as steel including but not limited to cold rolled or cold formed steel. First and second cross members 38, 40 are provided as rectangular shaped tubing in one embodiment, but can also be provided in other geometric shapes including round, oval, L-shaped, etc.

A first power unit support member 42 is releasably connectible between frame first cross member 38 and frame second cross member 40 respectively. First power unit support member 42 supports a power unit 43 which in some configurations is a battery unit 44. First power unit support member 42 is releasably connected to frame 12 allowing removal and replacement of power unit 43. A battery unit connection plug 46 flexibly extends from battery unit 44 via a battery unit power cord 47. Battery unit connection plug 46 is connectively joined to a mower connection plug 48 which itself is flexibly connected using a mower power cord 49 to walk-behind mower assembly 10. By connecting battery unit connection plug 46 to mower connection plug 48, electrical power is provided to walk-behind mower assembly 10 to energize each of first electric motor 34 and second electric motor 36. Battery unit 44 can provide approximately 48 volts direct current energy which is used to energize both first and second electric motors 34, 36, but one skilled in the art will recognize that other battery capacities are equally suitable. A wiring harness 50 is exemplary of an electrical connection made between first and second electric motors 34, 36 and control unit 20. Wiring harness 50 can also be provided as individual wires supported by or internally routed through handle assembly 19. Wiring harness 50 also provides electrical conductivity between mower power cord 49 and the various input switches 28 of control unit 20.

Battery unit 44 and first power unit support member 42 are releasably connectable from frame 12 and manually transported using a strap 52. Battery unit 44 can therefore be replaced during use of walk-behind mower assembly 10 with another similar battery unit (not shown) or an alternate power unit to be described later herein. The power unit replacing battery unit 44 can include a connection plug similar to battery unit connection plug 46 to simplify replacement of the power unit 43. Power unit 43 is mechanically fastenable and therefore easily releasable from its connection to frame 12. Power unit 43 can therefore be replaced with a different power unit or another power unit 43.

In some embodiments, the battery unit 44 capable of producing approximately 48 VDC has a weight of approximately 60 pounds which can be manually positioned or removed from walk-behind mower assembly 10 by a single person. During replacement of power unit 43 and/or installation or removal of wheels 32, a kickstand 53 is rotatably repositioned from the position shown in FIG. 1 to a ground contact position (not shown) to stabilize walk-behind mower assembly 10.

Figure 2:
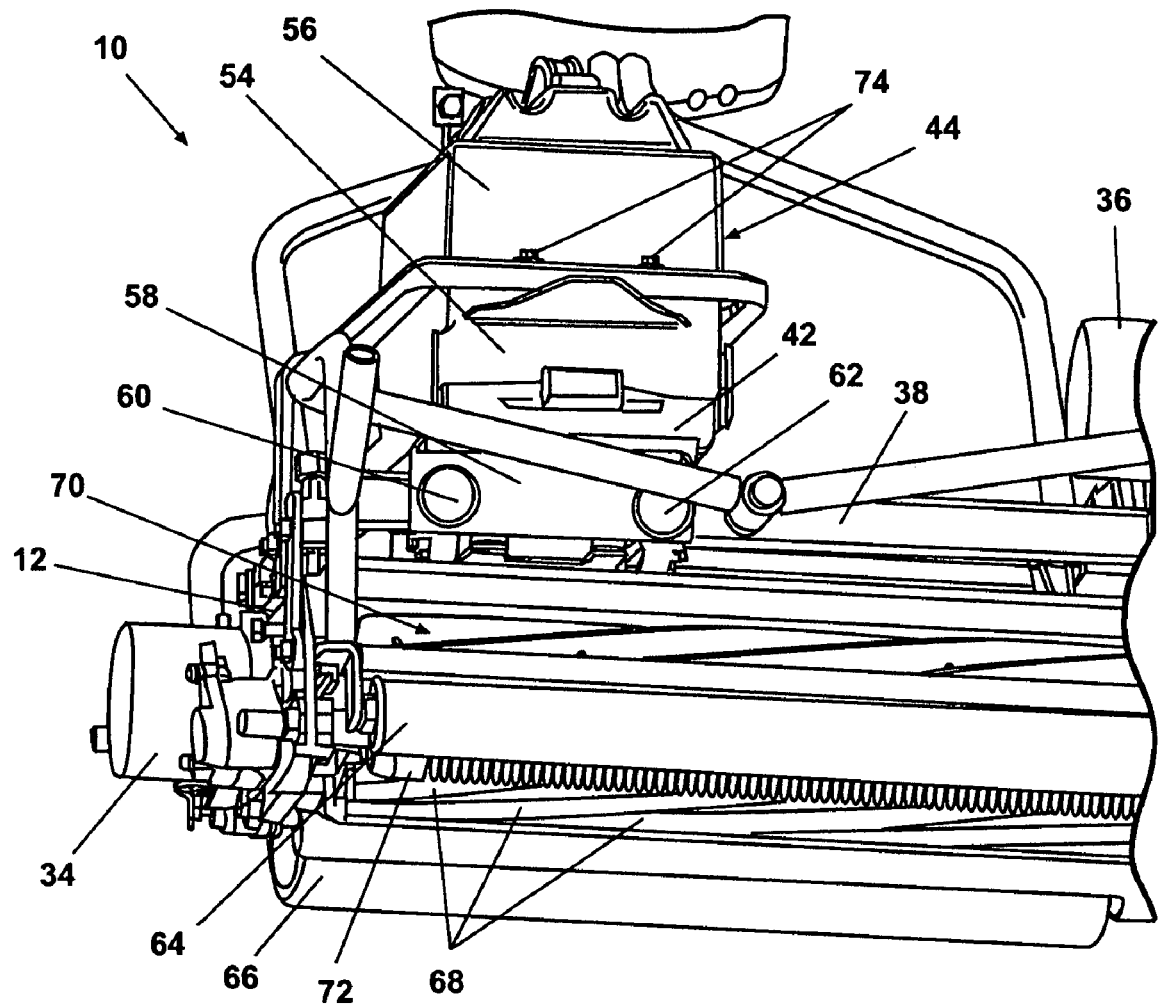
FIG. 2 is a front perspective view of the walk-behind mower of FIG. 1.

As best seen in reference to FIG. 2, battery unit 44 further includes a battery unit case 54 which provides an outer envelope within which one or more individual battery units are positioned. A battery unit cover 56 is releasably connected to battery unit case 54, for example to subsequently permit charging or testing of battery unit 44. First power unit support member 42 which supports battery unit 44 further includes a first support plate 58 which is fastenably connected to frame first cross member 38 using a first fastener 60 and a second fastener 62. The invention is not limited to the type or quantity of fasteners used to connect first support plate 58 to frame first cross member 38. More than two fasteners or a single fastener such as first fastener 60 alone can be used to releasably connect first power unit support member 42 to frame 12.

In some embodiments, first and second fasteners 60, 62 are limited-turn fasteners such as, for example, one-quarter-turn fasteners requiring approximately 90° rotation for complete installation or removal of the fasteners. This permits a rapid installation or disassembly of first power unit support member 42 from frame 12. Fasteners 60,62 can also be replaced with other fastener types such as stud bolts, bolts and nut combinations, screws, etc.

Walk-behind mower assembly 10 further includes a fixed position rotating drum 64, a variable height position rotating drum 66 operable as a traction drive wheel and a plurality of reel blades 68 which form part of a reel blade assembly 70 rotatably disposed on frame 12. A grooved roller 72 can also be used. A plurality of fasteners 74 are provided to demonstrate one configuration for connecting battery unit cover 56 to battery unit case 54. First electric motor 34 is directly mounted to frame 12 and positioned to directly drive reel blade assembly 70 such that a rotational speed of reel blade assembly 70 is directly controllable by varying a rotational speed of first electric motor 34. A cutting height for walk-behind mower assembly 10 is generally controllable in part by varying a position of variable height rotating drum 66. This can be done either manually or automatically using connections such as input switches 28 disposed on control unit 20.

Similar to the electronic speed control provided by first electric motor 34, a unit drive speed for walk-behind mower assembly 10 is also directly controllable by varying a rotational speed of second electric motor 36. The rotational speed of both or either of first and/or second electric motors 34, 36 can be controlled in various embodiments by varying the electrical voltage or current input to either of the motors. The drive circuitry for electric motors 34, 36 can reside in control unit 20 and is controllable using one or more of the plurality of input switches 28.

Figure 3:
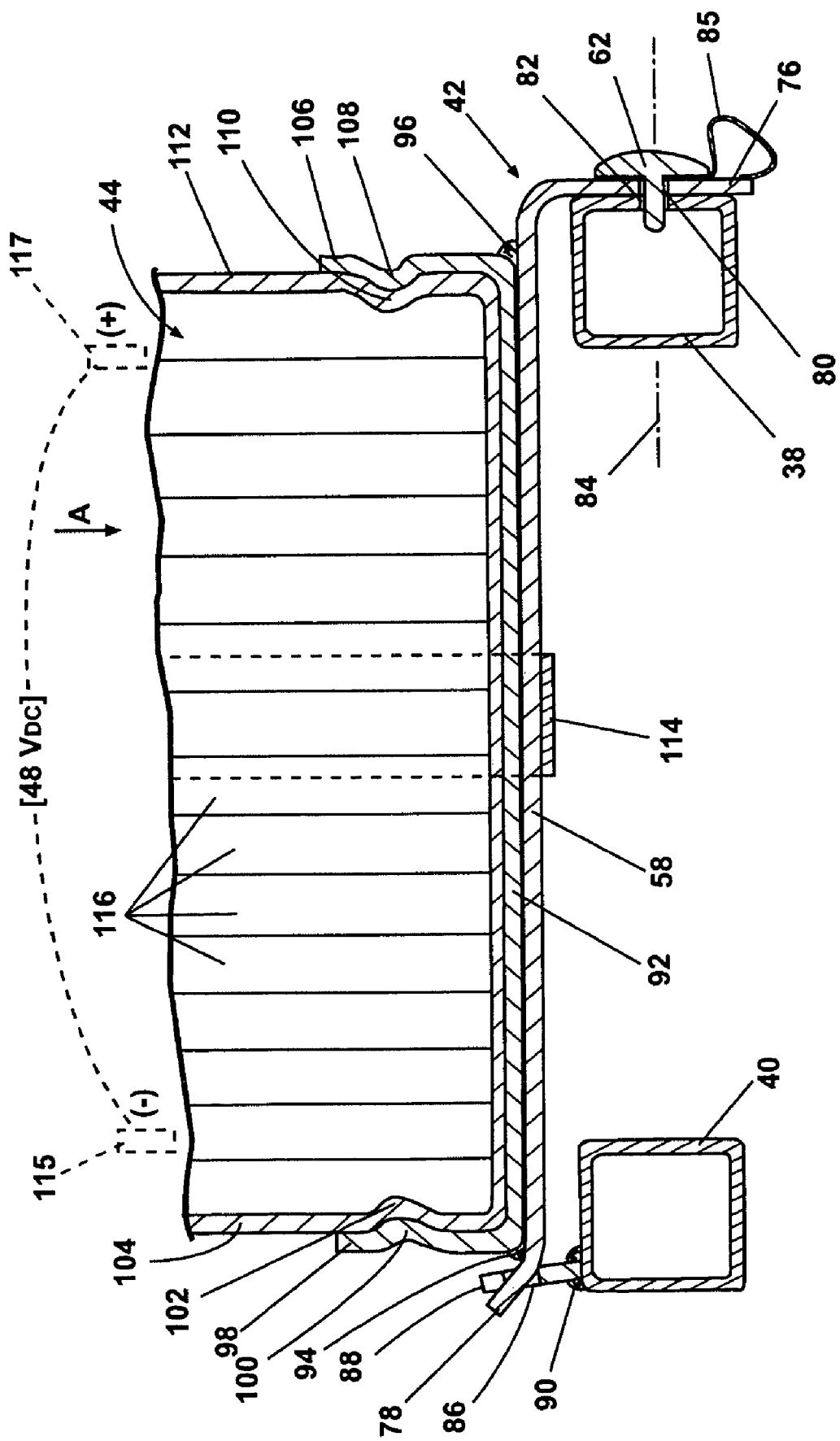
FIG. 3 is a partial cross sectional side elevational view taken at section 3-3 of FIG. 1.

Referring now generally to FIG. 3, in various embodiments, first power unit support member 42 includes first support plate 58 having an overlapping plate end 76 and at least one oppositely positioned male extending member 78. Overlapping plate end 76 is provided with the plurality of clearance apertures 80 each providing a clearance path for one of the first and/or second fasteners 60, 62 (second fastener 62 is shown in FIG. 3 only). Each clearance aperture 80 is coaxially aligned with a fastener receiving aperture 82 created in frame first cross member 38. Each fastener receiving aperture 82 matably receives one of first or second fasteners 60, 62. Each of clearance apertures 80 and fastener receiving apertures 82 are commonly provided on a fastener axis such as fastener axis 84. At least one retainer element 85 is connected to overlapping plate end 76, each connected to one of the fasteners 60,62 to non-releasably connect the fastener(s) to the overlapping plate end 76 and therefore prevent loss of the fastener(s). Retainer element 85 can be a polymeric material, a metallic material, or a composite material and can be provided in a string form, or as a strap or a flexible sheet. Retainer element 85 is positioned generally under a head of fasteners 60,62 and about a shank of the fastener so when the fastener is removed, retainer element 85 continues to engage the fastener at the shank. Other forms of retainer element 85 (not shown) can also be used, such as a reduced diameter shank portion of the fastener being received in an extended clearance aperture portion of overlapping end plate 76, with a larger diameter thread portion, permitting rotation and engagement of the fastener while preventing removal from overlapping end plate 76.

Male extending member 78 is slidably positioned within an engagement aperture 86 of a receiving member 88 fixedly connected to frame second cross member 40. An exemplary connection is shown as a weld joint 90. Prior to installation of either first or second fasteners 60, 62 male extending member 78 is slidably disposed within clearance aperture 80 and overlapping plate end 76 is then rotated into the position shown to subsequently receive first and second fasteners 60,62. In some embodiments, (not shown) male extending member 78 is replaced by an overlapping plate end similar to overlapping plate end 76 and additional fasteners such as first and second fasteners 60, 62 are connected through the overlapping plate end to frame second cross member 40.

First support plate 58 further supports a battery unit receiving housing 92 which is fastened to first support plate 58 for example using each of a first weld joint 94 and a second weld joint 96. Other fastening techniques can also be used such as mechanical fasteners, screws and/or bolts in place of first and second weld joints 94, 96. Battery unit receiving housing 92 further includes a first deflectable wall 98 having a first raised area 100 which is deflectably positioned within a recessed area 102 of a battery unit end plate 104 of battery unit receiving housing 92. Similarly, a second deflectable wall 106 includes a second raised area 108 which is received within a recessed area 110 of a battery unit end plate 112 of battery unit receiving housing 92. Battery unit 44 can therefore be positioned as shown by pressing battery unit 44 downwardly in a direction "A", outwardly deflecting each of first and second deflectable walls 98 and 106 until each of the first and second raised areas 100 and 108 elastically deflect to engage the recessed areas 102 and 110, respectively. Additional retention can also be provided for battery unit 44 including a strap 114 which encircles battery unit 44 and first support plate 58. Power unit 43 is removed by: disconnecting battery unit connection plug 46 from mower connection plug 48; removing first and second fasteners 60,62; rotating first support plate 58 and withdrawing male extending member 78 from clearance aperture 80; and lifting power unit 43 using strap 52 in a direction opposite to direction "A". Installation of a replacement power unit 43 is performed in an opposite series of steps.

A plurality of battery cells 116 are shown for battery unit 44. The configuration, storage capacity, and quantity of cells 116 can vary to vary an output voltage of battery unit 44. The voltage potential between each of a negative terminal 115 and a positive terminal 117 can therefore vary depending upon the number of cells 116. In some embodiments, 48 volt DC is supplied by battery unit 44.

Figure 4:
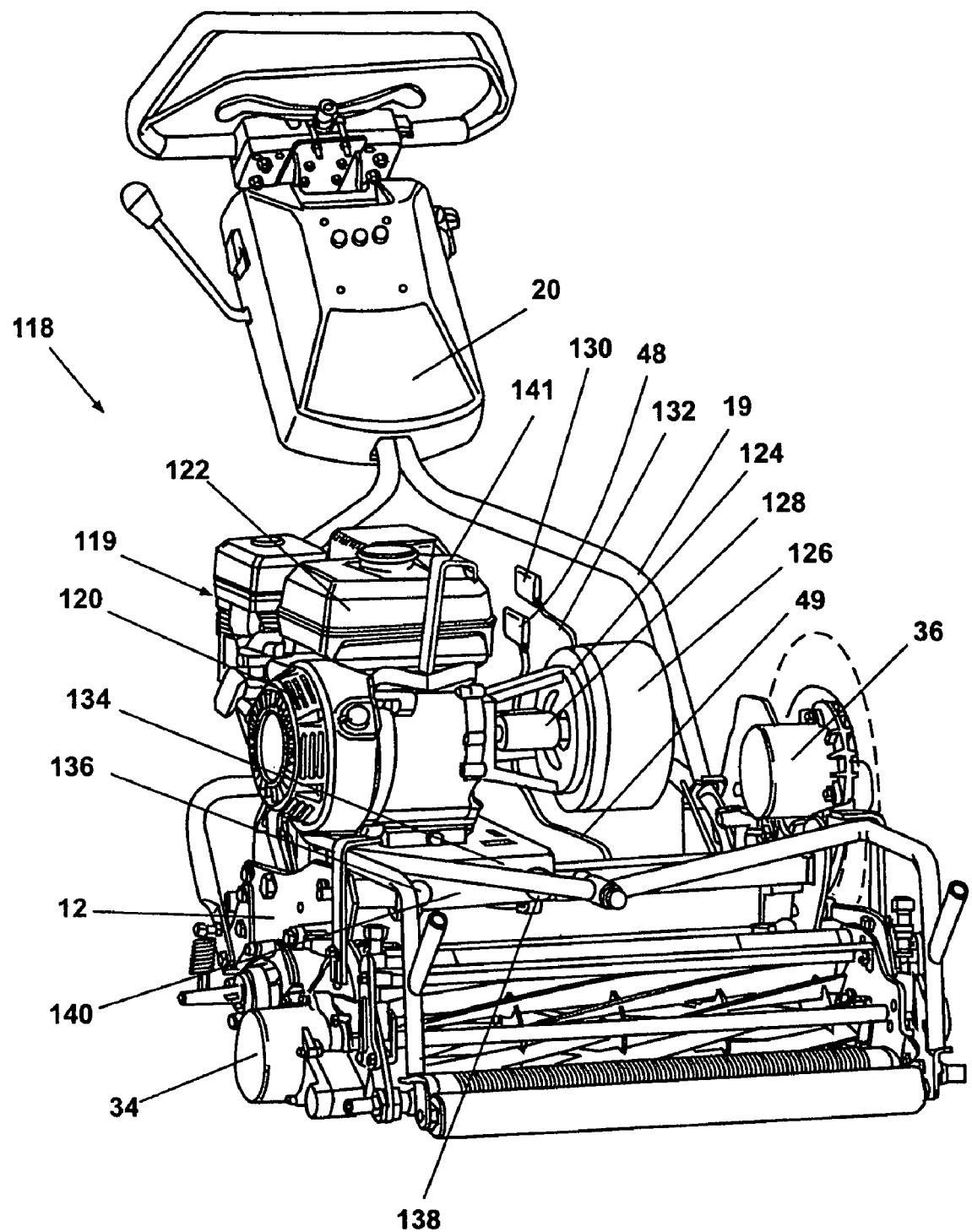
FIG. 4 is a perspective view of another embodiment of a walk-behind mower having a reciprocating motor modular power source of the present invention.

Referring now to FIG. 4, in some embodiments, walk-behind mower assembly 10 includes a walk-behind mower assembly 118 having as a power unit 119 reciprocating engine 120. Reciprocating engine 120 includes a fuel tank 122 such as a gasoline tank for providing fuel to operate reciprocating engine 120 for an extended period of time. A bell housing 124 extends from reciprocating engine 120 to support a generator 126. Generator 126 provides a voltage or current suitable to operate each of first and second electric motors 34, 36. According to some embodiments, generator 126 provides approximately 48 volts DC for operation of first and second electric motors 34, 36. A flexible coupling 128 is provided to rotatably join an output shaft of reciprocating engine 120 and generator 126. Flexible coupling 128 compensates for vibration as well as limited displacement of generator 126 relative to reciprocating engine 120 during up and down-throttle operations of reciprocating engine 120 as well as deflection due to motion of walk-behind mower assembly 118.

A generator connection plug 130 extends via a generator power cord 132 from generator 126. Generator connection plug 130 is flexibly positioned to allow connection to mower connection plug 48 flexibly extending from mower power cord 49. Power unit 119 is releasably connectible to frame 12 similarly to power unit 43. A second power unit support member 134 mechanically supports reciprocating engine 120 and permits releasable connection using first and second fasteners 136, 138 to frame first cross member 38 using each of the same connections used for first power unit support member 42. Second power unit support member 134 provides an overlapping plate end 140 for receiving first and second fasteners 136, 138. In some embodiments, power unit 119 weighs approximately 45 pounds, and battery unit 44 weighs approximately 60 pounds. Power unit 119 can be lifted using a lifting strap 141 and replaced with a battery unit 44 or another power unit 119.

Figure 5:
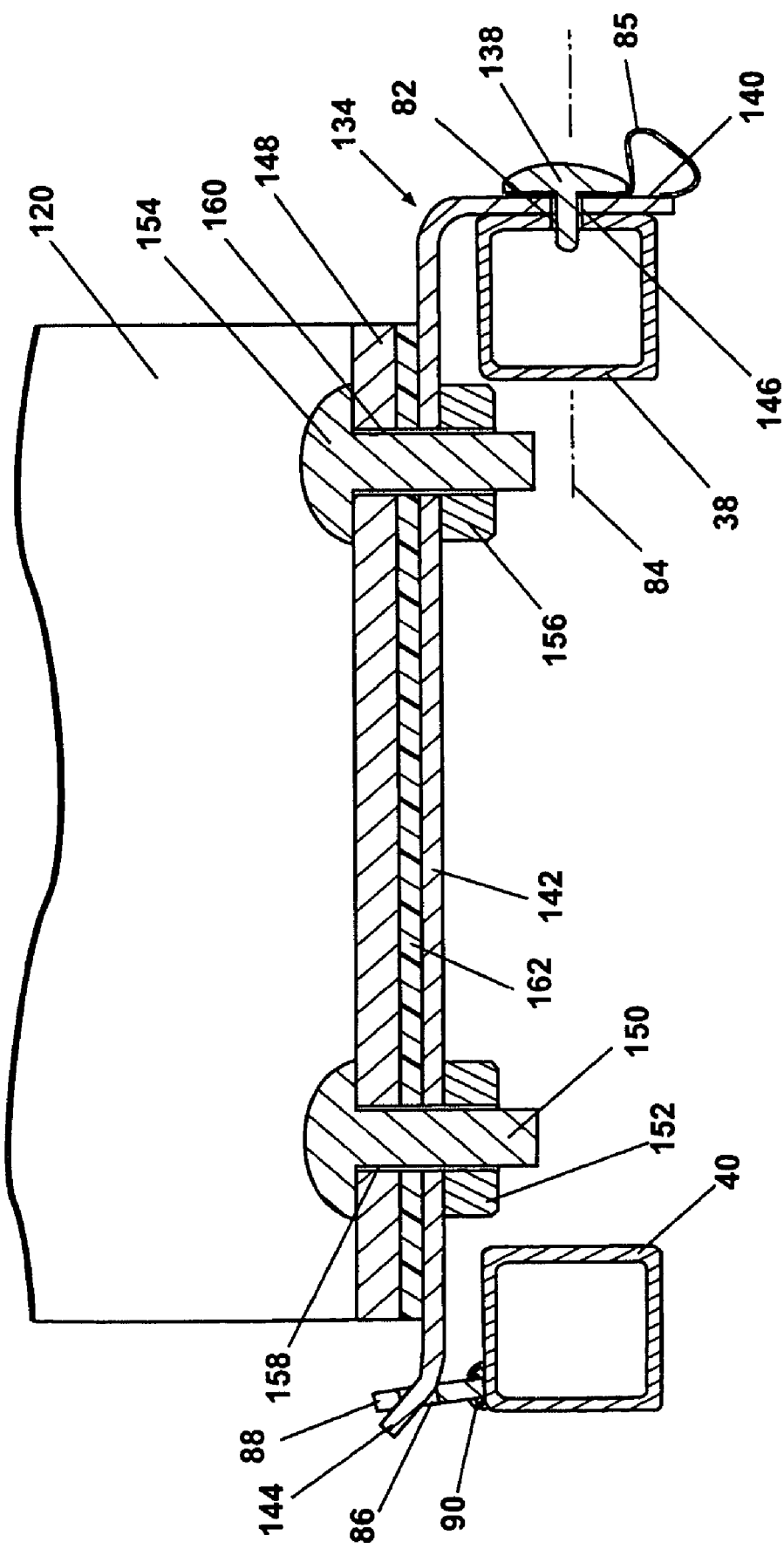
FIG. 5 is a partial cross sectional side elevational view taken at section 5-5 of FIG. 4.

As best seen in reference to FIG. 5, in some embodiments, connections for second power unit support member 134 include a second support plate 142 having overlapping plate end 140 distally extending from a first end and a male extending member 144 oppositely disposed from overlapping plate end 140. Overlapping plate end 140 and male extending member 144 are similar to overlapping plate end 76 and male extending member 78 of first power unit support member 42 to maximize interchangeability of the power units. A plurality of clearance apertures 146 are provided for each of first and second fasteners 136, 138. Clearance apertures 146 are coaxially aligned with fastener receiving apertures 82 on fastener axes 84 previously described in reference to frame first cross member 38. At least one retainer element 85 is connected to overlapping plate end 140 and each is connected to one of first and second fasteners 136,138 to non-releasably connect the fastener(s) to the overlapping plate end 140 and therefore prevent loss of the fastener(s).

Second power unit support member 134 further includes connections to attach an engine mounting flange 148 of reciprocating engine 120 using a first bolt 150 and first nut 152 and a second bolt 154 with a second nut 156. First bolt 150 is disposed through a clearance aperture 158 and second bolt 154 is disposed through a clearance aperture 160, respectively. An elastically flexible material such as rubber, soft polymeric material, or other elastomeric material is used for a flexible member 162 positioned between reciprocating engine 120 and second support plate 142. Flexible member 162 reduces the amount of vibration energy generated by reciprocating engine 120 transmitted through second power unit support member 134 to frame 12. Flexible member 162 further limits the transmission of acoustic energy between reciprocating engine 120 and second support plate 142 of second power unit support member 134.

The connection of reciprocating engine 120 to second power unit support member 134 shown in FIG. 5 is one example of a plurality of mounting techniques. Other embodiments can include the use of clamps, such as C-shaped clamps, bolt-down clamps, etc. Power unit 119 is removed by: disconnecting generator connection plug 130 from mower connection plug 48; removing first and second fasteners 136,138; rotating second support plate 142 and withdrawing male extending member 144 from clearance aperture 80; and lifting power unit 119 using strap 141. Installation of a different power unit is performed in an opposite series of steps.

A modular power source for the walk-behind mower described herein offers several advantages. By interchangeably mounting each of a plurality of power unit types using similarly mounted support members, a walk-behind mower described herein can support on the same platform either a reciprocating engine or a battery unit. Either a reciprocating engine having a generator, or a battery unit can be used to provide electrical power to energize multiple electric motors. The electric motors are separately energized to rotate a cutting blade assembly or to propel the greens mower. The interchangeable mount connections permit the power unit to be changed to accommodate different mowing requirements, such as noise restricted time periods or extended length cutting periods. A cord for each motor or a ganged electrical connection for multiple electric motors provides a releasable connection during change of the power unit. Quick mount fasteners and/or a sliding male/female joint provide for rapid interchangeability of the power units.

The description of the embodiments is merely exemplary in nature and, thus, variations that do not depart from the gist of the embodiments are intended to be within the scope of the invention. For example, first power unit support member 42 and second power unit support member 134 can be varied from that described herein. A plurality of male extending members 78, 144 can be used which engage in one of a plurality of apertures such as engagement aperture 86. Therefore a plurality of receiving members 88 can be used. The configuration of the male extending members of the support plates of the support members can be varied from that shown without departing from the gist of the invention. The male extending members of the various power unit support members can also be disposed through an aperture formed in frame second cross member 40, and the receiving member(s) 88 eliminated. Such variations are not to be regarded as a departure from the spirit and scope of the invention.

What is claimed is:

1. A power unit support assembly for a walk-behind mower, the power unit support assembly comprising:
   a mower frame including a fastener receiver and a receiving member having an aperture; and
   a plurality of power unit support members each adapted for supporting a different type of power unit, each support member including an extending member forming a bent tab with respect to said support member for sliding into, with clearance, said aperture of said receiving member so that said extending member must be rotated and slid into said aperture, said extending member extends beyond said aperture so that said extending member contacts a portion of said receiving member prohibiting a linear withdrawal of said extending member from said aperture so that said support member is rotated in order to withdraw said extending member from said receiving member aperture and said support members including a securement portion aligned with said fastener receiver to receive a fastener to secure the securement portion with the mower frame for providing a rapid disconnect between said support member and said mower frame such that the plurality of power unit support members and mower frame providing a system that enables different type of power units to be rapidly substituted for one another on said mower frame and said plurality of power unit support members each being releasably connectable to the mower frame, via said receiving member and fastener receiver, such that the system provides for the respective different types of power units to be rapidly interchangeably mounted to the mower frame providing the walk-behind mower with different types of power units for specific mowing tasks.

2. The power unit support assembly of claim 1, wherein each power unit support member further comprises a plate with said extending member integrally formed with it and adapted to slide into the aperture of the receiving member.

3. The power unit support assembly of claim 1, wherein the mower frame further comprises a tubular section having said fastener receiver.

4. The power unit support assembly of claim 3, wherein said fastener is adapted to threadably engage with the fastener receiver to releasably engage a selected one of the power unit support members to the mower frame.

5. The power unit support assembly of claim 4, wherein the fastener further comprises a partial turn fastener adapted to threadably engage the selected one of the power unit support members to the mower frame using less than one complete rotation of the fastener.

6. The power unit support assembly of claim 1, wherein the different types of power unit include a reciprocating engine and an energy storage device.

7. The power unit support assembly of claim 3, wherein each power unit support member further comprises at least one rapid installation fastener adapted to engage with the fastener receiver to releasably connect the respective power unit support members with the mower frame such that a first type of power unit and the respective support member can be rapidly disconnected and removed from the mower frame and replaced with a second type of power unit and the respective support member that can be rapidly mounted to the mower frame utilizing the rapid installation fastener.

8. A power unit support assembly for a walk-behind mower, the power unit support assembly comprising:
   a mower frame including a fastener receiver and a receiving member having an aperture; and
   a first support member having an energy storage device mounted thereto and a second support member having a reciprocating engine mounted thereto, each of the first and second support members structured with an extending member forming a bent tab with respect to said support member for sliding into, with clearance, said aperture of said receiving member so that said extending member must be rotated and slid into said aperture, said extending member extends beyond said aperture so that said extending member contacts a portion of said receiving member prohibiting a linear withdrawal of said extending member from said aperture so that said support member is rotated in order to withdraw said extending member from said receiving member aperture and said support members including a securement portion aligned with said fastener receiver to receive a fastener to secure the securement portion with the mower frame for providing a rapid disconnect between said support members and said mower frame such that the first and second support members and mower frame providing a system so that different type of power units are rapidly substituted for one another on said mower frame to be releasably connected to the mower frame such that the energy storage device and the reciprocating engine can be rapidly substituted for one another to interchangeably mount to the mower frame to provide the walk-behind mower with a choice of operating power to the mower.

9. The power unit support assembly of claim 8, wherein each of the first and second power unit support members are structured to receive at least one rapid installation fastener adapted to engage with said fastener receiver in the mower frame to releasably connect and disconnect the respective first and second power unit support members with the mower frame such that the energy storage device and the reciprocating engine can be rapidly interchangeably mounted to the mower frame.

10. A power unit support assembly for a walk-behind mower, the power unit support assembly comprising:

a mower frame including a fastener receiver and a receiving member having an aperture; and a plurality of power unit support members, each support member structured to be connected to a particular one of a plurality of power units, each power unit being of a different type than the other power units, and each respective support member structured with an extending member forming a bent tab with respect to said support member for sliding into, with clearance, said aperture of said receiving member so that said extending member must be rotated and slid into said aperture, said extending member extends beyond said aperture so that said extending member contacts a portion of said receiving member prohibiting a linear withdrawal of said extending member from said aperture so that said support member is rotated in order to withdraw said extending member from said receiving member aperture and said support members including a securement portion aligned with said fastener receiver for providing a rapid disconnect between said support members and said mower frame such that the plurality of power unit support members and mower frame provide a system so that different type of power units are rapidly substituted for one another on said mower frame and also to receive at least one rapid installation fastener to releasably fasten the respective support member to the mower frame such that the respective different power units can be interchangeably mounted to the mower frame and utilized to provide operating power to the mower.

\* \* \* \* \*